United States Patent
Takada

(10) Patent No.: US 12,067,488 B2
(45) Date of Patent: Aug. 20, 2024

(54) INFORMATION PROCESSING APPARATUS, INFORMATION PROCESSING METHOD, AND STORAGE MEDIUM FOR GENERATING LEARNING DATA USED FOR MACHINE LEARNING

(71) Applicant: CANON KABUSHIKI KAISHA, Tokyo (JP)

(72) Inventor: Yosuke Takada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 510 days.

(21) Appl. No.: 17/245,393

(22) Filed: Apr. 30, 2021

(65) Prior Publication Data

US 2021/0374527 A1 Dec. 2, 2021

(30) Foreign Application Priority Data

May 26, 2020 (JP) ................... 2020-091353

(51) Int. Cl.
*G06N 3/08* (2023.01)
*G06T 3/4015* (2024.01)
(Continued)

(52) U.S. Cl.
CPC ............ *G06N 3/08* (2013.01); *G06T 3/4015* (2013.01); *G06T 3/4046* (2013.01); *G06T 7/90* (2017.01);
(Continued)

(58) Field of Classification Search
CPC ............ G06N 3/02–0985; G06T 2207/20081; G06T 2207/20084; G06T 3/4046;
(Continued)

(56) References Cited

U.S. PATENT DOCUMENTS

| | | | |
|---|---|---|---|
| 2017/0236013 A1* | 8/2017 | Clayton | G06V 10/774 |
| | | | 382/104 |
| 2020/0193222 A1* | 6/2020 | Singh | G06F 18/2431 |
| 2023/0072040 A1* | 3/2023 | Kakishita | G06N 3/08 |

FOREIGN PATENT DOCUMENTS

| | | |
|---|---|---|
| CN | 110008783 A | 7/2019 |
| CN | 110781913 A | 2/2020 |
| JP | 2013162347 A | 8/2013 |
| JP | 2019-028876 A | 2/2019 |

OTHER PUBLICATIONS

Bonanomi, Cristian, et al. "I3D: a new dataset for testing denoising and demosaicing algorithms." Multimedia Tools and Applications 79 (2020): 8599-8626. (Year: 2018).*

He, Haibo, and Edwardo A. Garcia. "Learning from imbalanced data." IEEE Transactions on knowledge and data engineering 21.9 (2009): 1263-1284. (Year: 2009).*

(Continued)

*Primary Examiner* — Geoffrey E Summers
(74) *Attorney, Agent, or Firm* — Carter, DeLuca & Farrell LLP

(57) ABSTRACT

An object is to obtain a trained model whose robustness is high in a case of learning a network in an image signal processing system. For teacher images consisting an acquired teacher image group, a distribution characteristic of at least one of three attributes of color is analyzed and based on analysis results, a teacher image group uniform in the distribution characteristic is generated. Learning of a network is performed by generating a data set including a set of a teacher image and a pupil image from a new teacher image group thus obtained.

17 Claims, 13 Drawing Sheets

(51) Int. Cl.
  *G06T 3/4046* (2024.01)
  *G06T 7/90* (2017.01)
  *G06T 11/20* (2006.01)
  *G06T 11/40* (2006.01)

(52) U.S. Cl.
  CPC .............. *G06T 11/20* (2013.01); *G06T 11/40* (2013.01); *G06T 2207/20081* (2013.01); *G06T 2207/20084* (2013.01)

(58) Field of Classification Search
  CPC ........... G06T 7/90; G06T 11/20; G06T 11/40; G06T 3/4015
  See application file for complete search history.

(56) References Cited

OTHER PUBLICATIONS

Guillon, Sébastien, et al. "Reducing training dataset bias for automatic fault detection." SEG International Exposition and Annual Meeting. SEG, 2019. (Year: 2019).*

Shorten, Connor, and Taghi M. Khoshgoftaar. "A survey on image data augmentation for deep learning." Journal of big data 6.1 (2019): 1-48. (Year: 2019).*

Wan, Zhiqiang, Yazhou Zhang, and Haibo He. "Variational autoencoder based synthetic data generation for imbalanced learning." 2017 IEEE symposium series on computational intelligence (SSCI). IEEE, 2017. (Year: 2018).*

Notice of Reasons for Refusal issued by the Japanese Patent Office on Dec. 19, 2023 in corresponding JP Patent Application No. 2020-091353, with English translation.

* cited by examiner

| NUMBER | HUE_1 | HUE_2 |
|---|---|---|
| 1 | 125 | 0 |
| 2 | 125 | 5 |
| 3 | 125 | 10 |
| ⋮ | ⋮ | ⋮ |
| 25 | 125 | 120 |
| 26 | 125 | 130 |
| ⋮ | ⋮ | ⋮ |
| 36 | 125 | 180 |
| 37 | 60 | 0 |
| 38 | 60 | 5 |
| 39 | 60 | 10 |
| ⋮ | ⋮ | ⋮ |
| 48 | 60 | 55 |
| 49 | 60 | 65 |
| ⋮ | ⋮ | ⋮ |
| 72 | 60 | 180 |
| 73 | 75 | 0 |
| ⋮ | ⋮ | ⋮ |
| Num-2 | 180 | 165 |
| Num-1 | 180 | 170 |
| Num | 180 | 175 |

FIG.8

INFORMATION PROCESSING APPARATUS, INFORMATION PROCESSING METHOD, AND STORAGE MEDIUM FOR GENERATING LEARNING DATA USED FOR MACHINE LEARNING

BACKGROUND OF THE INVENTION

Field of the Invention

The present disclosure relates to generation of learning data for machine learning and a learning method.

Description of the Related Art

In recent years, a machine learning technique is made use of in a variety of fields, such as image recognition and image processing. Among machine learning, in a case of deep learning that requires a large amount of teacher data, on a condition that a sufficient amount of teacher data does not exist, the learning accuracy is reduced considerably. In this regard, Japanese Patent Laid-Open No. 2019-28876 has disclosed a technique to generate a sufficient amount of teacher data from a small amount of original data. Specifically, first, from an actually captured image obtained by performing image capturing with a camera, image-inherent components, such as camera parameters and light source parameters, are extracted. Then, a sufficient number of teacher images is obtained by changing the extracted image-inherent components and generating modified images (re-configured images in correlation with the actually captured image) whose position and kind of light source are changed by using the changed image-inherent components.

According to the method of Japanese Patent Laid-Open No. 2019-28876, it is possible to secure a sufficient number of teacher images but there is such a problem that a deviation occurs in the distribution of the three attributes of color (hue, saturation, luminance) in the obtained teacher image group. In a case where deep learning is performed by using the teacher image group such as this, it may happen sometimes that it is not possible to generate a trained model whose robustness is high. Specifically, it is assumed that there is a deviation in the hue distribution of the teacher image group in a case of learning a convolutional neural network (CNN)-based demosaic network described in Deep Joint Demosaicking and Denoising. ACM Transactions on Graphics, 35 (6); 191 (2016). In this case, on a condition that a RAW image is demosaicked by using the learning results (trained model), it may happen sometimes that a false pattern that does not exist originally occurs. Then, this phenomenon appears conspicuously in the hue whose appearance frequency in the teacher image group is low.

SUMMARY OF THE INVENTION

Consequently, an object of the technique of the present disclosure is to obtain a trained model whose robustness is high in a case of learning the CNN-based network in an image signal processing system of, such as demosaic, noise reduction, and super resolution.

The information processing apparatus according to the present disclosure is an information processing apparatus that generates learning data used for machine learning and includes: an acquisition unit configured to acquire a teacher image group; an analysis unit configured to analyze a distribution characteristic of teacher images consisting the teacher image group; and a generation unit configured to generate a teacher image group uniform in the distribution characteristic based on results of the analysis, and the distribution characteristic represents a distribution in the teacher image group of at least one of three attributes of color.

Further features of the present invention will become apparent from the following description of exemplary embodiments with reference to the attached drawings.

BRIEF DESCRIPTION OF THE DRAWINGS

FIG. 8 is a diagram showing an example of a hue information file;

DESCRIPTION OF THE EMBODIMENTS

Figure 1:
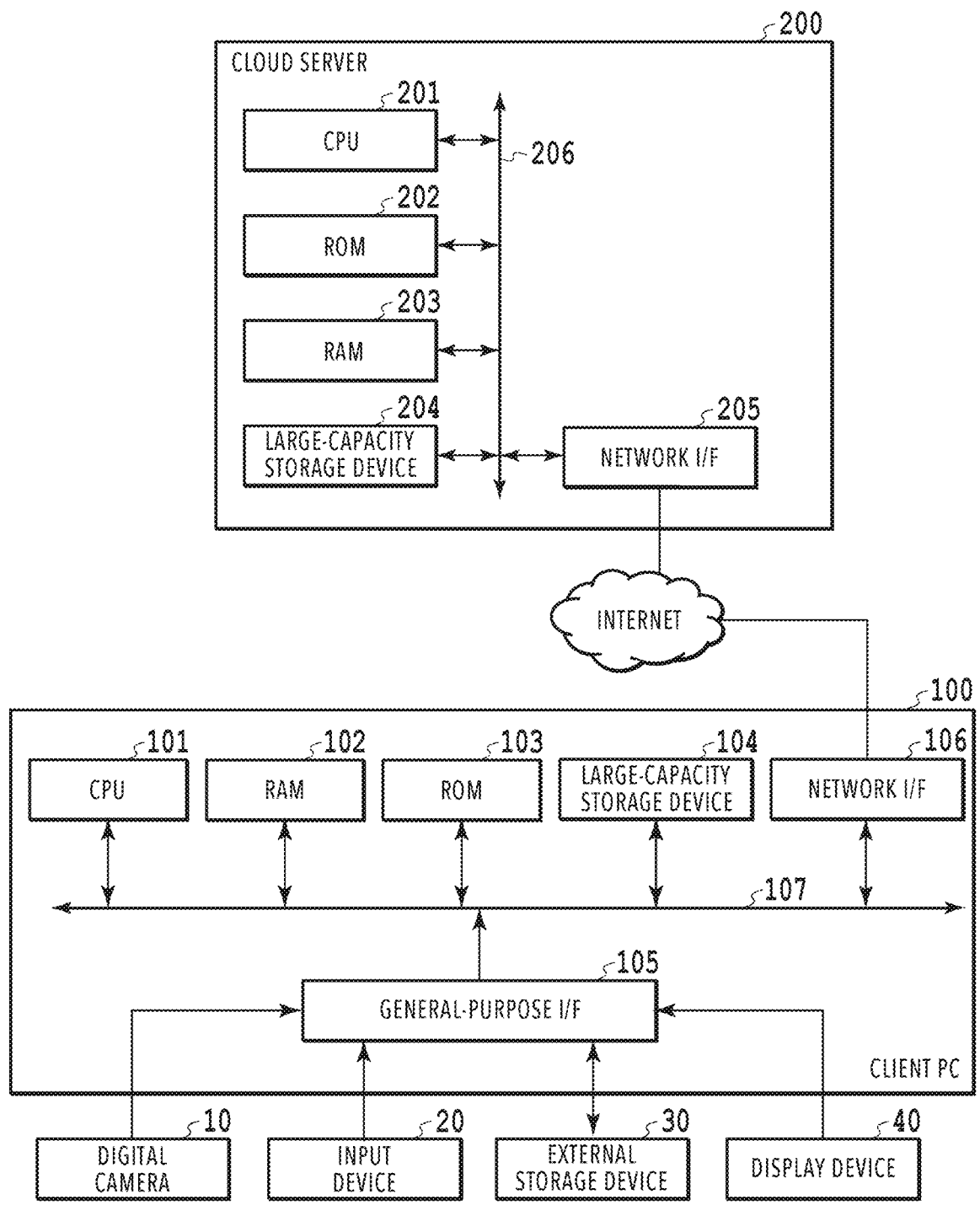
FIG. 1 is a diagram showing an example of a configuration of an information processing system.

Hereinafter, with reference to the attached drawings, the present invention is explained in detail in accordance with preferred embodiments. Configurations shown in the following embodiments are merely exemplary and the present invention is not limited to the configurations shown schematically.

<About CNN>

First, a convolutional neural network (CNN) used generally in the image processing technique that applies deep learning, which appears in each embodiment below, is explained. The CNN is a technique to repeat a nonlinear operation after performing convolution of a filter generated by learning for image data. The filter is also called a local receptive field (LRF). The image data that is obtained by performing the nonlinear operation after convolution of the filter for the image data is called a feature map. Further, the learning is performed by using learning data including a pair of input image data and output image data. In brief, generating the value of the filter that can convert input image data into corresponding output image data with a high accuracy from the learning data is learning. Details of this will be described later.

In a case where image data has RGB color channels or in a case where the feature map includes a plurality of pieces of image data, the filter that is used for convolution also has a plurality of channels accordingly. That is, the convolution filter is represented by a four-dimensional array including the number of channels, in addition to the vertical and horizontal sizes and the number of pieces of image data. The processing to perform the nonlinear operation after convolution of the filter for the image data (or feature map) is indicated in units of layers and the feature map and the filter are represented as, for example, the nth-layer feature map and the nth-layer filter.

Further, for example, the CNN in which the filter convolution and the nonlinear operation are repeated three times has a three-layer network structure. The nonlinear operation processing such as this can be formularized as formula (1) below.

$$X_n^{(1)} = f(\Sigma_{k=1}^K W_n^{(1)} * X_{n-1}^{(1)} + b_n^{(1)})$$

In formula (1) described above, $W_n$ is an nth-layer filter, $b_n$ is an nth-layer bias, f is a nonlinear operator, $X_n$ is an nth-layer feature map, and * is a convolution operator. Here, (1) at the top left indicates that the filer or feature map is the first filter or feature map. The filter and the bias are generated by learning, to be described later, and called all together "network parameters". As the nonlinear operation, for example, the sigmoid function or ReLU (Rectified Linear Unit) is used. In a case of ReLU, the nonlinear operation is given by formula (2) below.

$$f(X) = \begin{cases} X & \text{if } 0 \leq X \\ 0 & \text{otherwise} \end{cases}$$

As shown in formula (2) described above, among elements of an input vector X, a negative element is zero and a positive element remains the same as it is.

As the network that uses the CNN, ResNet in the image recognition field and its applied RED-Net in the super resolution field are well known. Each makes an attempt to improve the accuracy of the processing by increasing the number of layers of the CNN and performing the filter convolution a number of times. For example, the ResNet is characterized by a network structure in which a path to shortcut the convolutional layers is provided and due to this, implements a multi-layer network as many as 152 layers and implements recognition of high accuracy which is close to a human recognition ratio. The reason the accuracy of the processing improves by the multi-layer CNN is simply that it is possible to represent a nonlinear relationship between input and output by repeating the nonlinear operation a number of times.

<Learning of CNN>

Next, the learning of the CNN is explained. The learning of the CNN is performed by minimizing the objective function generally expressed by formula (3) below for the learning data including a set of input learning image (observed image) data and corresponding output learning image (correct answer image).

$$L(\theta) = \frac{1}{n}\Sigma_{i=1}^n \|F(X_j; \theta) - Y_j\|_2^2$$

In formula (3) described above, L is a loss function that measures an error between the correct answer and its estimation. $Y_i$ is ith output learning image data and $X_i$ is ith input learning image data F is a function that expresses all the operations (formula 1) together performed in each layer of the CNN. Further, θ is the network parameter (filter and bias). Further, $\|Z\|_2$ is the L2 norm and in brief, the root of the sum of squares of elements of a vector Z. Further, n is the number of pieces of learning data that is used for learning. Generally, the number of pieces of learning data is large, and therefore, in the stochastic gradient descent (SGD) method, part of the learning image data is selected randomly and used for learning. Due to this, it is possible to reduce the calculation load in the learning using a large number of pieces of learning data. Further, as the object function minimization (optimization) method, a variety of methods are known, such as the momentum method, the AdaGrad method, the AdaDelta method, and the Adam method. The Adam method is given by formula (4) below.

$$g = \frac{\partial L}{\partial \theta_i^t}$$
$$m = \beta_1 m + (1 - \beta_1)g$$
$$v = \beta_2 v + (1 - \beta_2)g^2$$
$$\theta_i^{t+1} = \theta_i^t - \alpha \frac{\sqrt{1-\beta_2^t}}{(1-\beta_1^t)} \frac{m}{(\sqrt{v} + \in \varepsilon)}$$

In formula (4) described above, $\theta_i^t$ is an ith network parameter in tth repetition and g is the gradient of the loss function L relating to $\theta_i^t$. Further, m and v are moment vectors, a is a base learning rate, β1 and β2 are hyper parameters, and ε is a small constant. No selection policy of the optimization method in learning exists, and therefore, basically any method may be used, but it is known that a difference in the learning time occurs because the convergence is different for different methods.

First Embodiment

In the present embodiment, a method of generating a preferred teacher image group with no deviation of the hue distribution is explained. As described previously, for effective deep learning, it is not sufficient only to prepare a large amount of teacher image data but it is important to prepare a teacher image group uniform in the hue distribution. Even though sample images (original images) of all objects having a variety of shapes and colors are collected in order to obtain a large number of teacher images, a deviation occurs generally in the hue distribution of the teacher image group. In a case where the RAW image is demosaicked using a trained model (demosaic network) obtained by learning using the teacher image group such as this, it may happen sometimes that a false pattern that does not exist originally occurs in the demosaicked RGB image. Consequently, in the present embodiment, an aspect is explained in which a teacher image group uniform in the hue distribution is obtained by specifying a portion where the hue distribution is sparse in the prepared sample image group and compensating for the sparse portion by generating CG (Computer Graphics) images that fill in the sparse portion. The RAW image means an image in the linear color space, which is captured by a single-chip imaging sensor to which attached a color filter corresponding to one color at one pixel position. Further, the false pattern refers to a pattern having a correlation with a color filter array.

<System Configuration>

FIG. 1 is a diagram showing an example of the configuration of an information processing system according to the present embodiment. In the information processing system shown in FIG. 1, a cloud server 200 in charge of the generation of learning data and demosaic learning and a client PC 100 in charge of demosaic inference are connected via the internet.

<Hardware Configuration of Client PC>

The client PC 100 of the present embodiment is an image processing apparatus that performs demosaic inference for a RAW image (mosaic image) that is input from an imaging device by applying a trained network parameter provided from the cloud server 200. A user obtains an image (RGB image) including three channels of RGB by demosaicking the RAW image, which is a mosaic image, by making use of an image processing application installed in the client PC 100. The client PC 100 has a CPU 101, a RAM 102, a ROM 103, a large-capacity storage device 104, a general-purpose interface (I/F) 105, and a network I/F 106 and each component is connected to one another by a system bus 107. Further, the client PC 100 is also connected to a digital camera 10, an input device 20, an external storage device 30, and a display device 40 via the general-purpose I/F 105.

The CPU 101 executes programs stored in the ROM 103 by using the RAM 102 as a work memory and centralizedly controls each component of the client PC 100 via the system bus 107. Further, the large-capacity storage device 104 is, for example, an HDD or an SSD and stores various kinds of data that is handled in the client PC 100. The CPU 101 writes data to the large-capacity storage device 104 and reads data stored in the large-capacity storage device 104 via the system bus 107. The general-purpose I/F 105 is a serial bus interface, for example, such as USB, IEEE 1394, and HDMI (registered trademark). The client PC 100 acquires data from the external storage device 30 (various storage media, for example, such as memory card, CF card, SD card, and USB memory) via the general-purpose I/F 105. Further, the client PC 100 receives user instructions from the input device 20, such as a mouse and a keyboard, via the general-purpose I/F 105. Further, the client PC 100 outputs image data and the like processed by the CPU 101 to the display device 40 (various image display devices, for example, such as liquid crystal display) via the general-purpose I/F 105. Further, the client PC 100 acquires data of a captured image (RAW image) that is a developing processing target from the digital camera 10, which is an imaging device, via the general-purpose I/F 105. The network I/F 106 is an interface for connecting to the internet. The client PC 100 acquires a network parameter for demosaic inference by accessing the cloud server 200 by an installed web browser.

<Hardware Configuration of Cloud Server>

The cloud server 200 of the present embodiment is a server apparatus that provides a cloud service on the internet. In more detail, the cloud server 200 provides a network parameter as learning results (trained model) in response to a request from the client PC 100 by generating learning data and performing demosaic learning. The cloud server 200 has a CPU 201, a ROM 202, a RAM 203, a large-capacity storage device 204, and a network I/F 205 and each component is connected to one another by a system bus 206. The CPU 201 controls the entire operation by reading control programs stored in the ROM 202 and performing various kinds of processing. The RAM 203 is used as a temporary storage area, such as a main memory and a work area, of the CPU 201. The large-capacity storage device 204 is a large-capacity secondary storage device, such as an HDD and an SSD, which stores image data and various programs. The network I/F 205 is an interface for connecting to the internet and provides the above-described network parameter in response to a request from a web browser of the client PC 100.

The components of the client PC 100 and the cloud server 200 exist other than those described above, but they are not the main purpose of the present invention, and therefore, explanation thereof is omitted. Further, in the present embodiment, it is supposed that the generation of learning data and demosaic learning are performed by the cloud server 200, the network parameter, which is learning results, is downloaded to the client PC 100, and demosaic inference of a development-target RAW image is performed. However, the above-described system configuration is an example and the system configuration is not limited to this. For example, the configuration may be one in which the function in the charge of the cloud server 200 is divided into sub-functions and the generation of learning data and demosaic learning are performed by different apparatuses. Further, the configuration may be one in which all the generation of learning data, demosaic learning, and demosaic inference are performed in the digital camera 10 comprising both the function of the client PC 100 and the function of the cloud server 200.

<Flow of Processing of Entire System>

Figure 2:
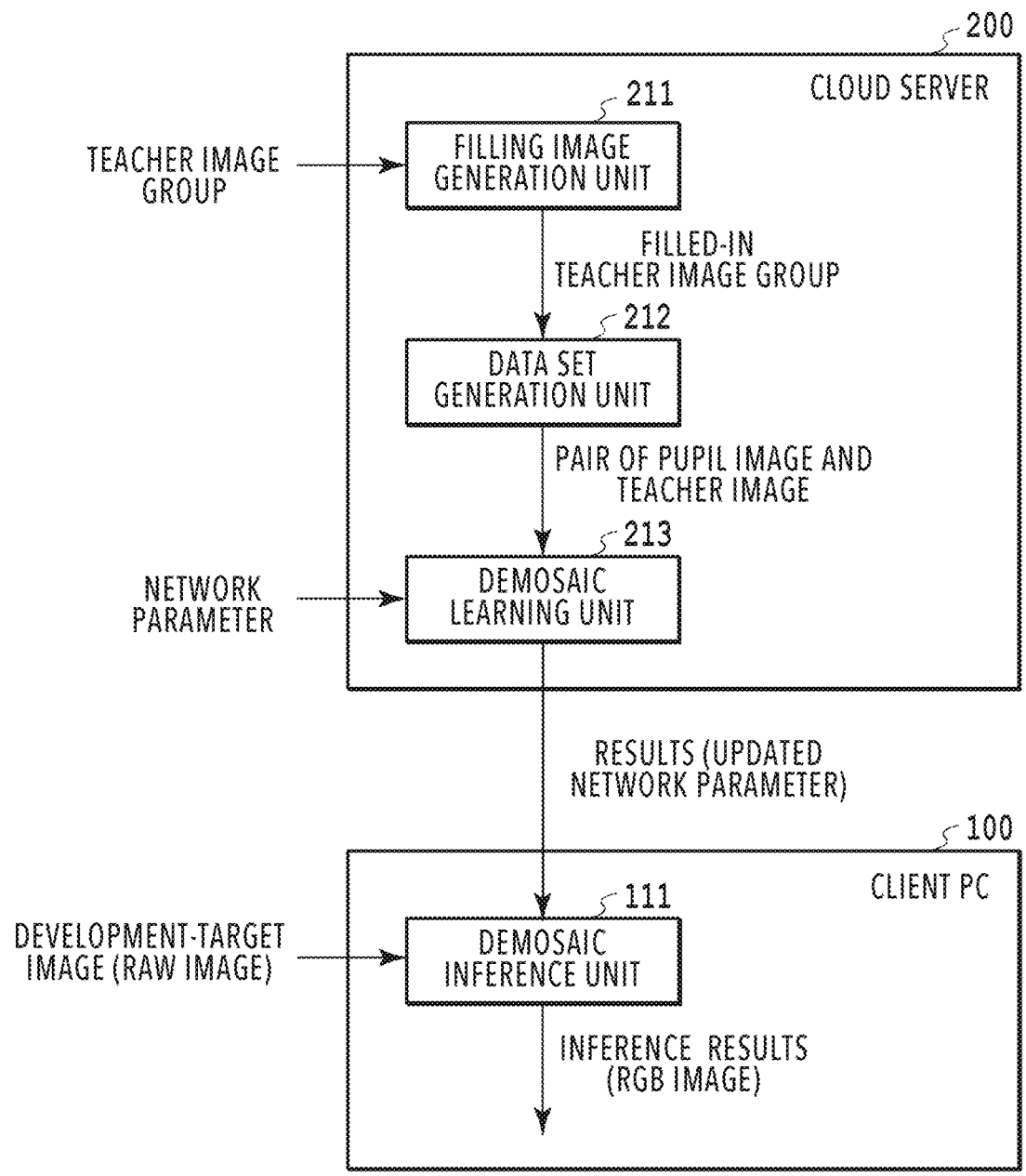
FIG. 2 is a block diagram of the entire information processing system.
Figure 3:
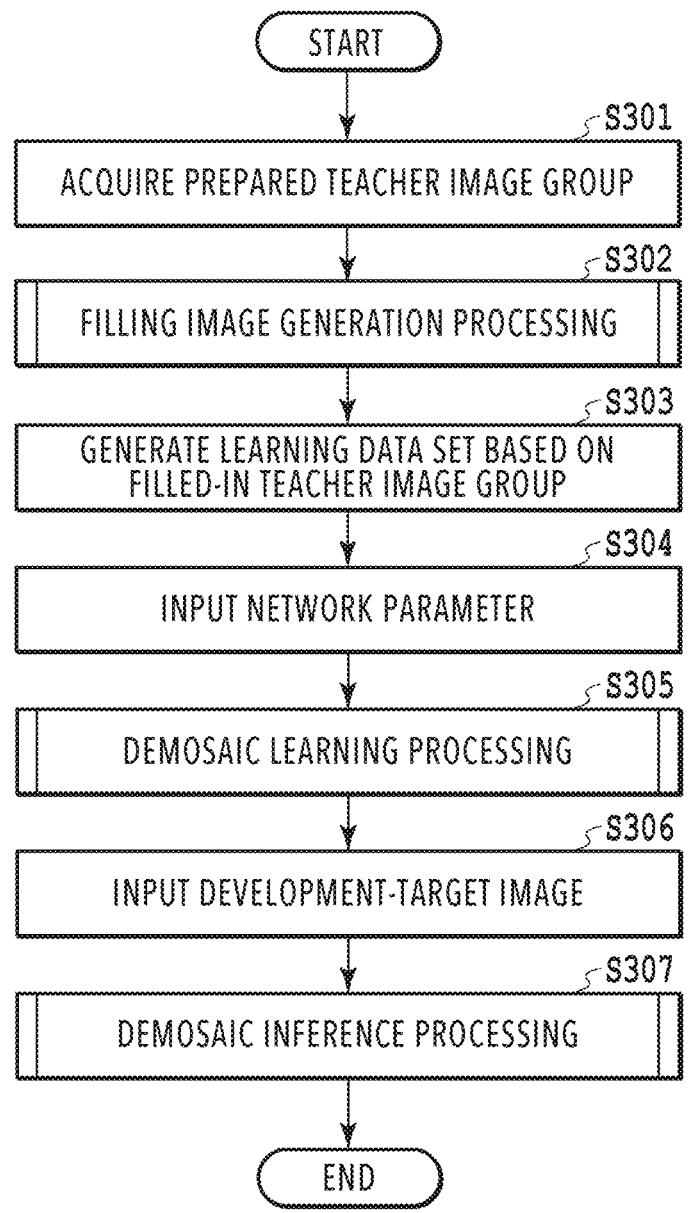
FIG. 3 is a flowchart showing a flow of processing in the information processing system.

Next, various kinds of processing performed in the information processing system of the present embodiment are explained. FIG. 2 is a function block diagram of the entire information processing system and FIG. 3 is a flowchart showing a flow of processing in the information processing system. As shown in FIG. 2, the client PC 100 has a demosaic inference unit 111. Further, the cloud server 200 has a filling image generation unit 211, a data set generation unit 212, and a demosaic learning unit 213. Each function unit shown in FIG. 2 is implemented by the CPU 101/201 executing the computer program corresponding to each function unit. However, all or part of the function units shown in FIG. 2 may be implemented by hardware. In the following, explanation is given along the flow in FIG. 3. In the following explanation, symbol "S" means a step.

At S301, data of a teacher image group prepared in advance is input to the cloud server 200. The teacher image is an image including three channels of RGB and obtained by, for example, performing image capturing with the digital camera 10. Generally, the teacher image corresponds to a variety of kinds of captured image, for example, nature photos such as landscapes and animals, human photos such as portraits and sports scenes, artificial object photos such as buildings and products, and the like. Further, it may also be possible to upload a photo obtained by performing image capturing with the digital camera 10 as it is, or it may also be possible to store a captured photo in an HDD or the like and upload the stored photo. The data of the teacher image group that is input to the cloud server 200 is sent to the filling image generation unit 211.

At S302, the filling image generation unit 211 performs processing to analyze the teacher image group that is input at S301 and create an image that fills in the sparse portion in the hue distribution by CG. Here, the image that fills in the sparse portion means an image including pixels having a signal value (attribute value) whose appearance frequency is low and pixels having the other signal values (attribute values) in the hue distribution obtained by the analysis. Details of this filling image generation processing will be described later.

Figure 4:
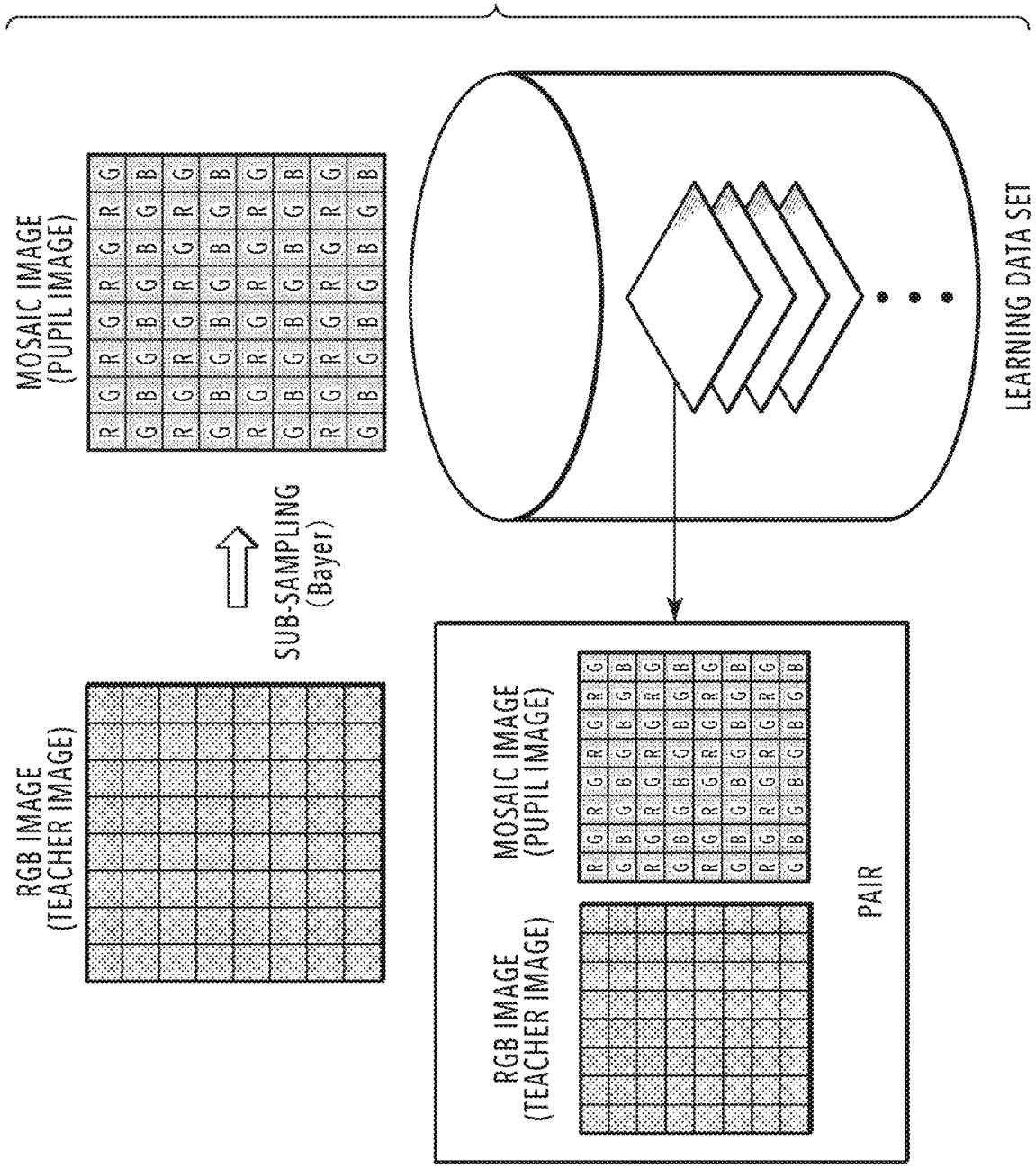
FIG. 4 is a diagram explaining generation of data set.

At S303, the data set generation unit 212 generates a data set (pair of teacher image and pupil image) used for leaning based on the teacher image group including the CG image generated at S302. FIG. 4 is a diagram explaining the generation of a data set. FIG. 4 shows the way a pupil image, which is a mosaic image, is generated by sub-sampling pixels of the teacher image including three channels of RGB in accordance with the Bayer array. Here, as the color filter array, the Bayer array is used, but it is only required to determine the color filter array in accordance with the image format of the input RAW image and for example, it may also be possible to use another color filter array, such as X-Trans. The generated data set is sent to the demosaic learning unit 213.

At S304, the above-described network parameter that is applied to the CNN of demosaic learning is input to the cloud server 200. The input network parameter is sent to the demosaic learning unit 213.

At S305, the demosaic learning unit 213 learns the CNN using the data set generated at S303 after initializing the weight of the CNN using the received network parameter. Details of the demosaic learning will be described later.

At S306, the RAW image is input, which is the target of the developing processing. It may also be possible to directly input the RAW image obtained by performing image capturing with the digital camera 10, or it may also be possible to read the RAW image captured in advance and stored in the large-capacity storage device 104. Further, image capturing parameters, such as the ISO sensitivity at the time of capturing the input RAW image, are also input. The data of the input RAW image is sent to the demosaic inference unit 111.

At S307, the demosaic inference unit 111 constructs the same CNN as that used in the learning in the demosaic learning unit 213 and demosaicks the input RAW image. At this time, the existing network parameter is initialized by the updated network parameter received form the cloud server 200. After this, an RGB image (inference results) is obtained by inputting the input RAW image to the CNN to which the updated network parameter has been applied and performing demosaicking by the same method as that performed in the demosaic learning unit 213.

The above is the flow of the entire processing performed by the information processing system of the present embodiment. In the data set that is generated at S303, the image pair of each teacher image included in the filled-in teacher image group and the pupil image that forms the pair is included, but the pupil image may be generated later. Specifically, it may also be possible to configure the processing so that the contents of the data set that is generated at S303 are caused to include only the data of the filled-in teacher image group and the corresponding pupil image group is generated in the subsequent demosaic learning (in the processing to calculate an error (loss function) between the teacher image and the demosaicked pupil image).

<Filling Image Generation Processing>

Figure 5:
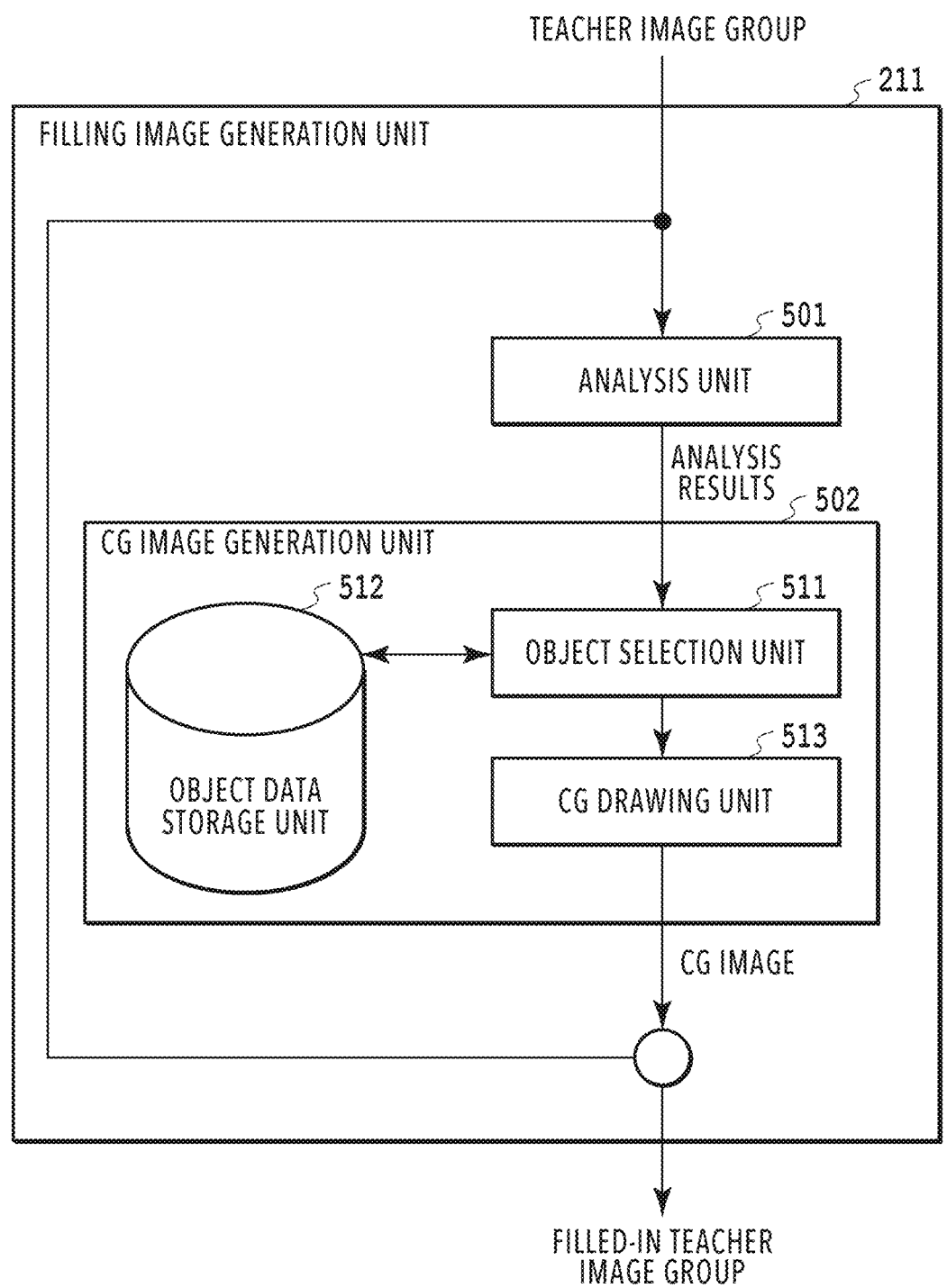
FIG. 5 is a block diagram showing an internal configuration of a filling image generation unit according to a first embodiment.
Figure 6:
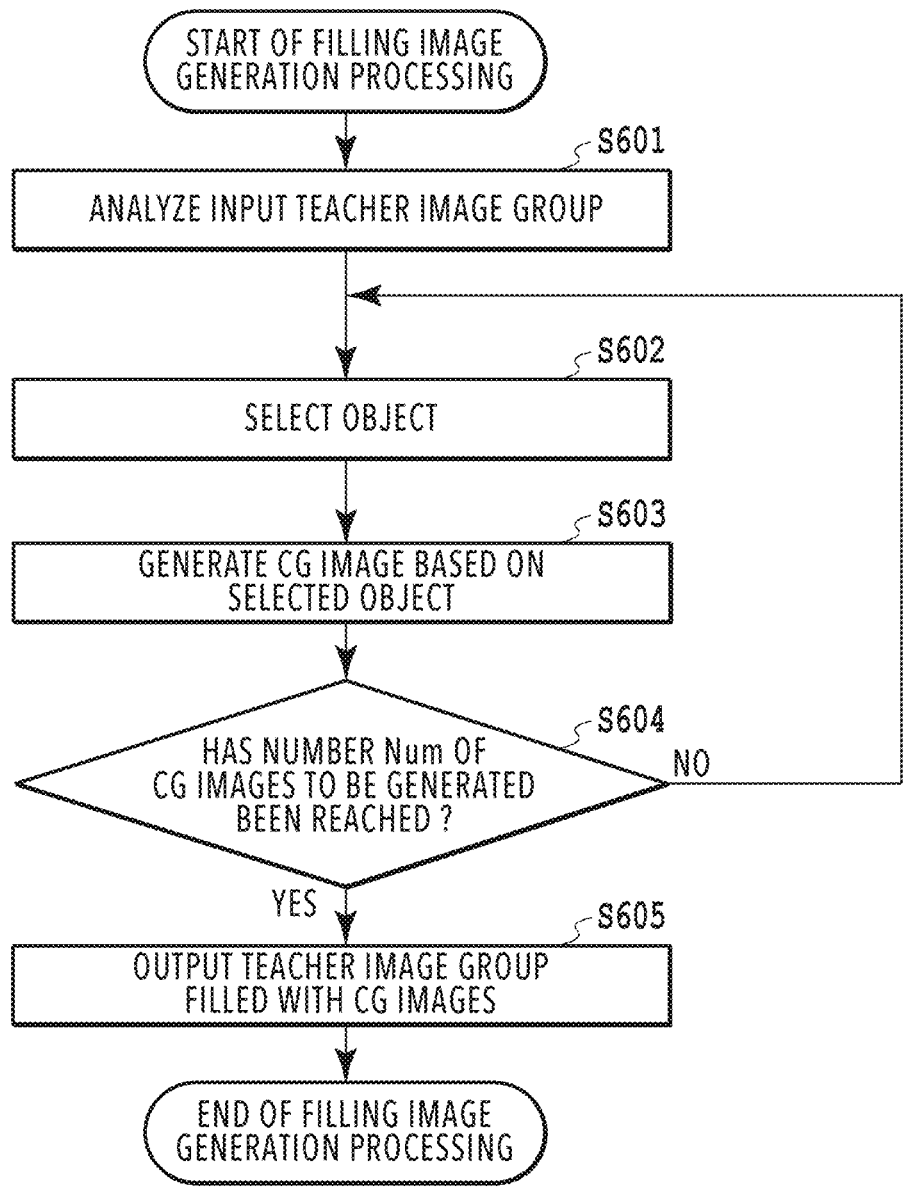
FIG. 6 is a flowchart showing details of filling image generation processing according to the first embodiment.

Following the above, the filling image generation processing at S302 described previously is explained. In the present embodiment, an example is explained in which a hue histogram is found by analyzing the hue of each teacher image included in the input teacher image group and a CG image that compensates for the hue whose appearance frequency is low is created. FIG. 5 is a block diagram showing the internal configuration of the filling image generation unit 211 according to the present embodiment. As shown in FIG. 5, the filling image generation unit 211 has an analysis unit 501 and a CG image generation unit 502. Further, the CG image generation unit 502 comprises an object selection unit 511, an object data storage unit 512, and a CG drawing unit 513. FIG. 6 is a flowchart showing details of the filling image generation processing according to the present embodiment. In the following, the operation of the filling image generation unit 211 is explained along the flow in FIG. 6.

Figure 7A:
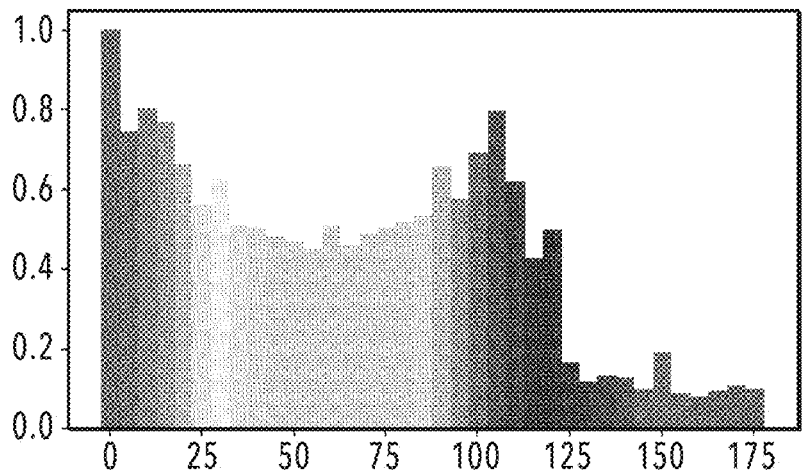
FIG. 7A to FIG. 7C are each a diagram showing an example of a hue histogram.

At S601, the analysis unit 501 analyzes the hue distribution of the input teacher image group. Here, an analysis method of the hue distribution is explained with reference to FIG. 7A to FIG. 7C. FIG. 7A is a hue histogram generated by converting all the teacher images consisting the input teacher image group from the RGB color space into the HSV color space and extracting only the values of the hue (H). The horizontal axis in the hue histogram in FIG. 7A represents the position of the hue on the spectrum and the position is indicated by an angle between 0 and 180 degrees. Further, the vertical axis represents the appearance frequency of each hue. In a case of the color hue histogram in FIG. 7A, it is known that the appearance frequency of the hue in the range between 125 degrees and 180 degrees is low compared to that in the other range (between zero degrees and 125 degrees). The analysis unit 501 stores information relating to the hue whose appearance frequency is low as a "hue information file" based on the analysis results such as these. In the hue information file, two kinds of angle information on angles (hue_1) included in the hue range in which the appearance frequency is low and angles (hue_2) of the other hue are described corresponding to a number Num of CG images to be generated. Here, it is sufficient to set the number Num of CG images to be generated in advance so that the ratio of the number of CG images to the total number of teacher images included in the input teacher image group is constant. FIG. 8 shows an example of the hue information file that is obtained from the hue histogram shown in FIG. 7A described above. In the leftmost column, the data numbers are described in ascending order corresponding to the number Num of CG images to be generated, in the middle column, the angle information on hue_1 is described, and in the rightmost column, the angle information on hue_2 is described.

At S602, the object selection unit 511 selects one arbitrary object, which is the target of drawing, from among a variety of objects stored in the object data storage unit 512. It is assumed that shape information in accordance with a variety of kinds of object, such as figure, symbol, character, and repetitive pattern, are stored in the object data storage unit 512. It is desirable that each object specified by the shape information include at least one connection area having substantially the same pixel value, the size of each connection area be larger than the filter size of the CNN, and the shape of the hue histogram of all the connection areas have bimodality. The object specified by the shape information may include noise. It is sufficient to determine the object to be selected randomly from among the prepared object data.

Figure 9A:
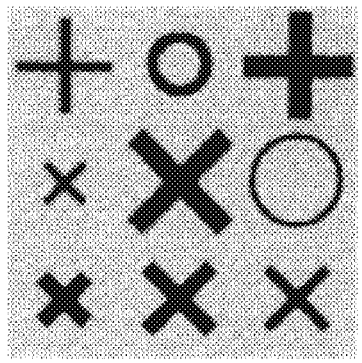
FIG. 9A to FIG. 9E are each a diagram showing an example of a CG image.
Figure 9B:
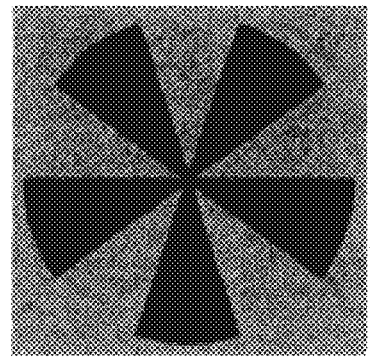
Figure 9C:
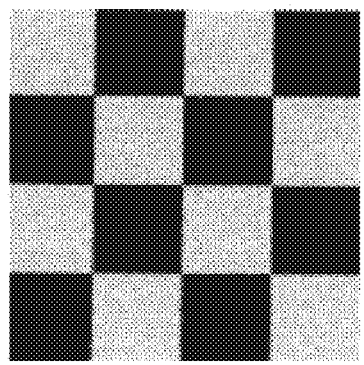
Figure 9D:
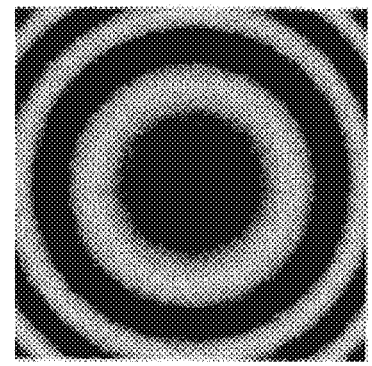
Figure 9E:
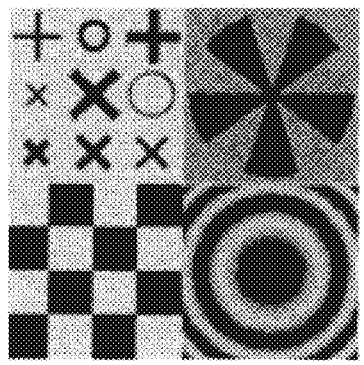

At S603, the CG drawing unit 513 generates the CG image of the object selected at S602. At this time, hue_1 and hue_2 stored in association with the data number in the above-described hue information file are allocated to the foreground and the background, respectively. For example, in a case where the selected object is a symbol object, hue_1 is allocated to the symbol portion that is the foreground and hue_2 is allocated to the portion that is the background, and so on. However, it is only required for the CG image to be generated to include two kinds of hue, and therefor, it may also be possible to allocate hue_1 to the background and allocate hue_2 to the foreground. FIG. 9A to FIG. 9D each show an example of the CG image that is generated at this step. What is important in generating these CG images is that the boundary (edge) shape of the two kinds of hue to be allocated in the connection area has as many variations as possible. In a case where the generated CG image does not satisfy a predetermined condition, for example, in a case where the hue ratios within the CG image are extremely different, it may also be possible to adjust the hue ratios by integrating the CG image with another CG image, and so on. FIG. 9E shows a CG image obtained by connecting the four CG images shown in FIG. 9A to FIG. 9D into the shape of an N×N tile and reducing so as to become the same size as that of the other CG images. It is sufficient to determine whether or not to perform integration by performing threshold value processing to determine whether the ratio between the areas occupied by two hues respectively in the generated CG image exceeds a predetermined ratio (for example, hue_1:hue_2=9:1), and so on.

At S604, whether or not the CG images corresponding to the number of data numbers specified in the hue information file have been generated, that is, whether or not the number of generated CG images has reached the number Num of CG images to be generated described above is determined. In a case where the number of generated CG images has reached the number Num of CG images to be generated, the processing advances to S605 and in a case where the number Num has not been reached, the processing returns to S602, and the next object is selected and the generation of a CG image is continued.

At S605, the teacher image group that becomes the analysis target at S601 is filled with the generated CG images and output to the data set generation unit 212 as the data of a new teacher image group with no deviation in the hue distribution.

Figure 7B:
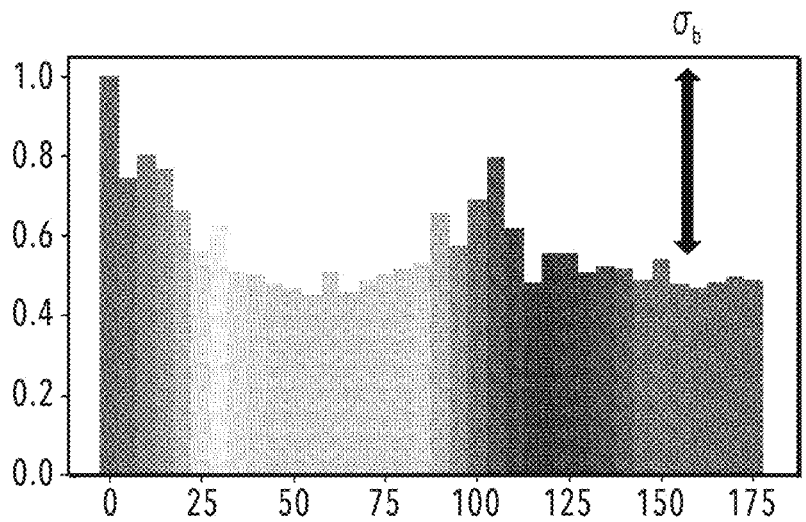
Figure 7C:
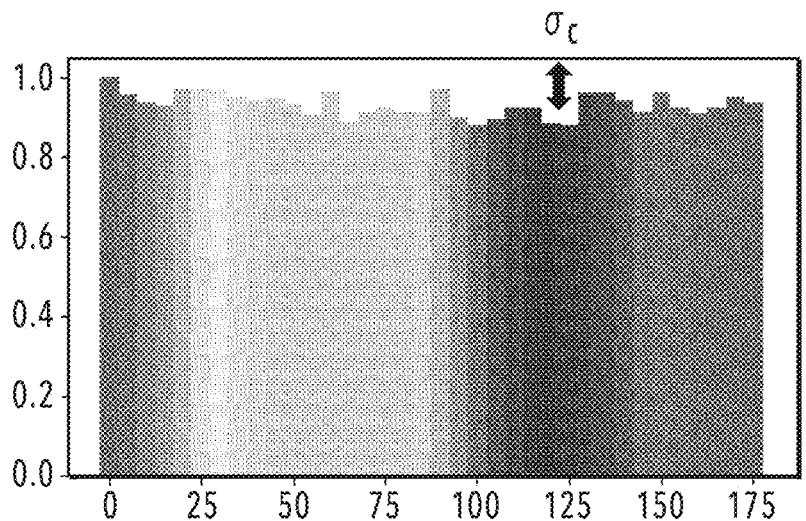

The above is the contents of the filling image generation processing according to the present embodiment. In the above-described embodiment, the CG images are generated in accordance with the number of CG images to be generated, which is set in advance, but this is not limited. For example, it may also be possible to add a CG image to the input teacher image group each time the CG image is generated and find the hue histogram again, and in a case where the deviation of the hue appearance frequency is eliminated, the generation of the CG image may be terminated in that stage. At this time, whether not the deviation is eliminated can be determined by, for example, threshold value processing. Specifically, it is sufficient to determine that there is no deviation in a case where the standard deviation of the appearance frequency in the newly found hue histogram is less than or equal to a threshold value th that is set in advance. For example, it is assumed that the hue histograms as shown in FIG. 7B and FIG. 7C are obtained from the teacher image group filled with CG images. In a case of FIG. 7B, it is determined that there is a deviation because $\sigma_b \geq$ th and in a case of FIG. 7C, it is determined that there is no deviation because $\sigma_b <$ th. Then, in a case where it is determined that the deviation is not eliminated yet, the hue whose frequency is low is specified from the newly found hue histogram and the hue information file is updated, and the generation of the CG image is continued until the deviation in the hue distribution is eliminated. It may also be possible to control how many CG images to be generated by the method such as this.

<Demosaic Learning Processing>

Figure 10:
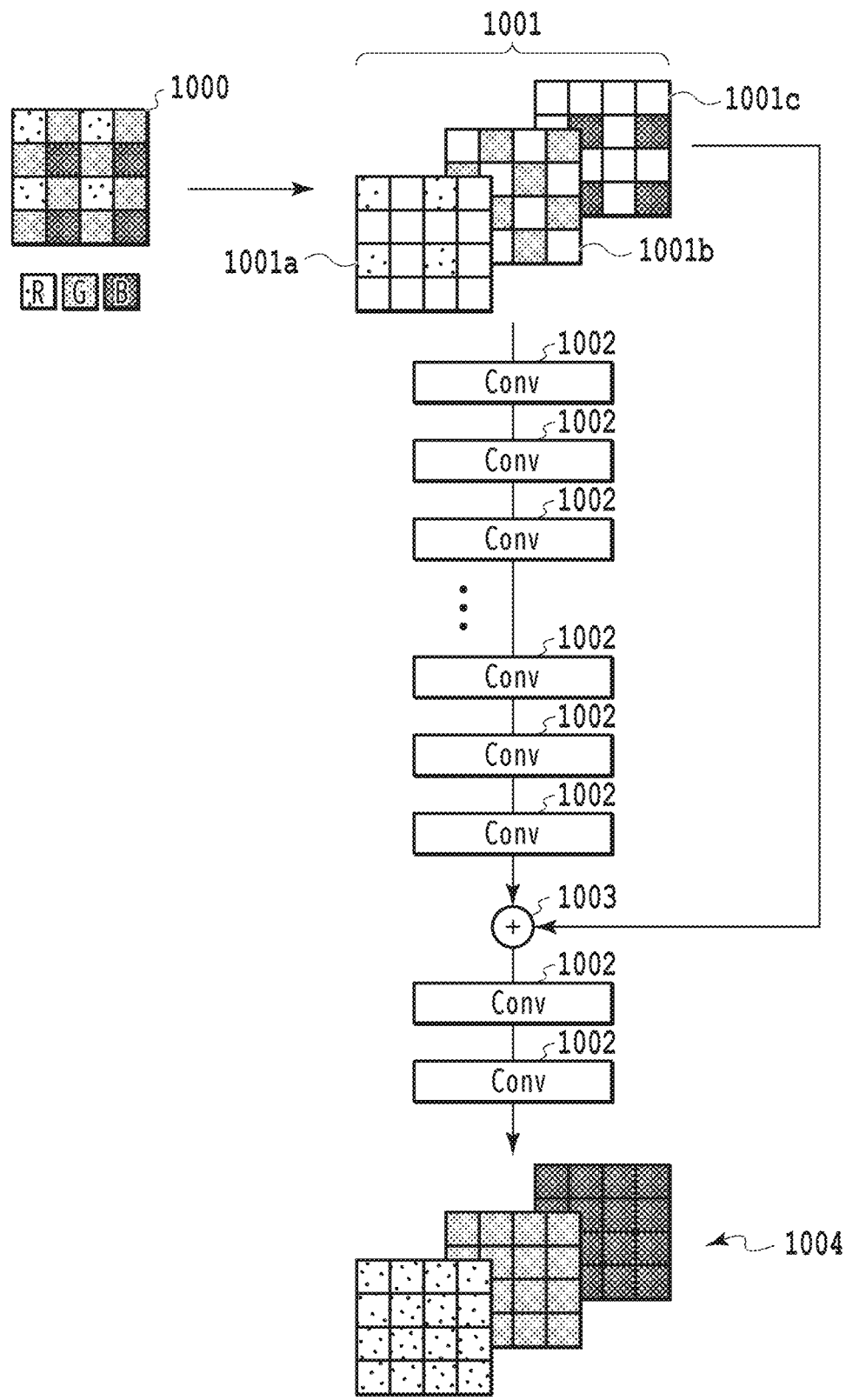
FIG. 10 is a diagram explaining a structure of a CNN and a flow of learning.

Following the above, demosaic learning in the demosaic learning unit 213 is explained. For the learning, for example, the CNN disclosed in Deep Joint Demosaicking and Denoising. ACM Transactions on Graphics, 35 (6): 191 (2016) is used. FIG. 10 is a diagram explaining the structure of the CNN and the flow of the learning. In the following, with reference to FIG. 10, the demosaic learning is explained in detail.

The CNN includes a plurality of filters 1002 performing the operation in formula (1) described previously. To this CNN, a pupil image 1000 included in the pair image described previously is input. At this time, as shown in FIG. 10, the pupil image 1000 is converted into a defect image 1001 of three channels and then input. In an R channel 1001a in the defect image 1001, only the pixels of the R component of the pupil image 1000 are included and to the other pixels, a defect value (0) is set. This is also the same with the G channel and the B channel. That is, in a G channel 1001b, only the pixels of the G component of the pupil image 1000 are included and to the other pixels, the defect value (0) is set. Further, in a B channel 1001c, only the pixels of the B component of the pupil image 1000 are included and to the other pixels, the defect value (0) is set. It may also be possible to set the defect value by performing interpolation by a method, such as bilinear interpolation. Next, a feature map is calculated by sequentially applying the filters 1002 to the defect image 1001. Following this, by a connection layer 1003, the calculated feature map and the defect image 1001 are connected in the channel direction. In a case where the number of channels of the feature map is n1 and that of the defect image is n2, the number of channels of the connection results is (n1+n2). Following this, the filters 1002 are applied to the connection results and three channels of RGB are output from the last filter. Due to this, images including three channels of RGB are obtained as inference results 1004. Then, a loss function value is obtained by finding a difference between the obtained inference results 1004 and the teacher image (not shown schematically) included in the pair image and calculating the average of the entire image. Then, by using the obtained loss function value, the network parameters are updated by back propagation or the like.

It may also be possible to further fine-tune the CNN after the demosaic learning as described above. Fine-tuning is a learning method of fine-tuning the weight of the trained model. As a specific method, first, a chart image (mosaic image) including a combination of hues whose appearance frequency is low statistically is demosaicked by using a trained model and whether or not a false pattern occurs is inspected. As the combination of hues whose appearance frequency is low, mention is made of, for example, a combination of green and magenta, which are in a complementary color relationship. In a case where a false pattern occurs in the demosaicked chart image, the data set is reconfigured by focusing attention mainly on the teacher image having a combination of hues similar to the combination of hues in the chart image and the trained model is fine-tuned. Due to this, it is possible to improve robustness of the trained model.

<Modification Example>

In the present embodiment, the analysis is performed for all the teacher images included in the input teacher image group and the CG images that fill in the sparse portion in the hue distribution are generated, but this is not limited. For example, it may also be possible to generate the CG images that fill in the sparse portion by performing the analysis using only part of the teacher images included in the input teacher image group.

Further, in the present embodiment, the CG images that eliminate the deviation are generated by analyzing the hue distribution, but it may also be possible to generate the CG images so that the deviation in each distribution is eliminated by analyzing another distribution characteristic, such as the saturation distribution and the luminance distribution.

Further, in the present embodiment, by adding the CG images to the portion at which the hue distribution is sparse (by filling in the portion at which the hue distribution is sparse with the CG images) in the input teacher image group, the hue distribution is made uniform, but in contrast to this, it may also be possible to make the hue distribution uniform by deleting (thinning) the teacher images from the portion at which the hue distribution is dense.

Further, in the present embodiment, explanation is given by taking demosaic as an example, but by using the teacher image group generated by the present method, it is also possible to improve the robustness of deep learning in another image signal processing system (for example, noise reduction, super resolution and the like). It is possible to implement the noise reduction and super resolution that apply deep learning by using the teacher image group generated by the present method in the publicly known CNN-based network (REDNET, SRCNN and the like).

As above, according to the present embodiment, in a case where there is a deviation in the distribution of the three attributes (hue, saturation, luminance) of the color in the teacher image group. CG images are generated so that the deviation is eliminated and the teacher images are filled therewith. Due to this, it is possible to obtain a demosaic model whose robustness is high.

Second Embodiment

In the first embodiment, the aspect is explained in which the teacher image group whose hue distribution is uniform is obtained by adding the CG images generated based on the object data to the teacher image group as new teacher images. Next, an aspect is explained as a second embodiment in which a teacher image group whose hue distribution is uniform is obtained by adding images obtained by modifying teacher images included in an input teacher image group as new teacher images. Explanation of the contents common to those of the first embodiment, such as the basic configuration of the information processing system, is omitted and in the following, different points are explained mainly.

Figure 11:
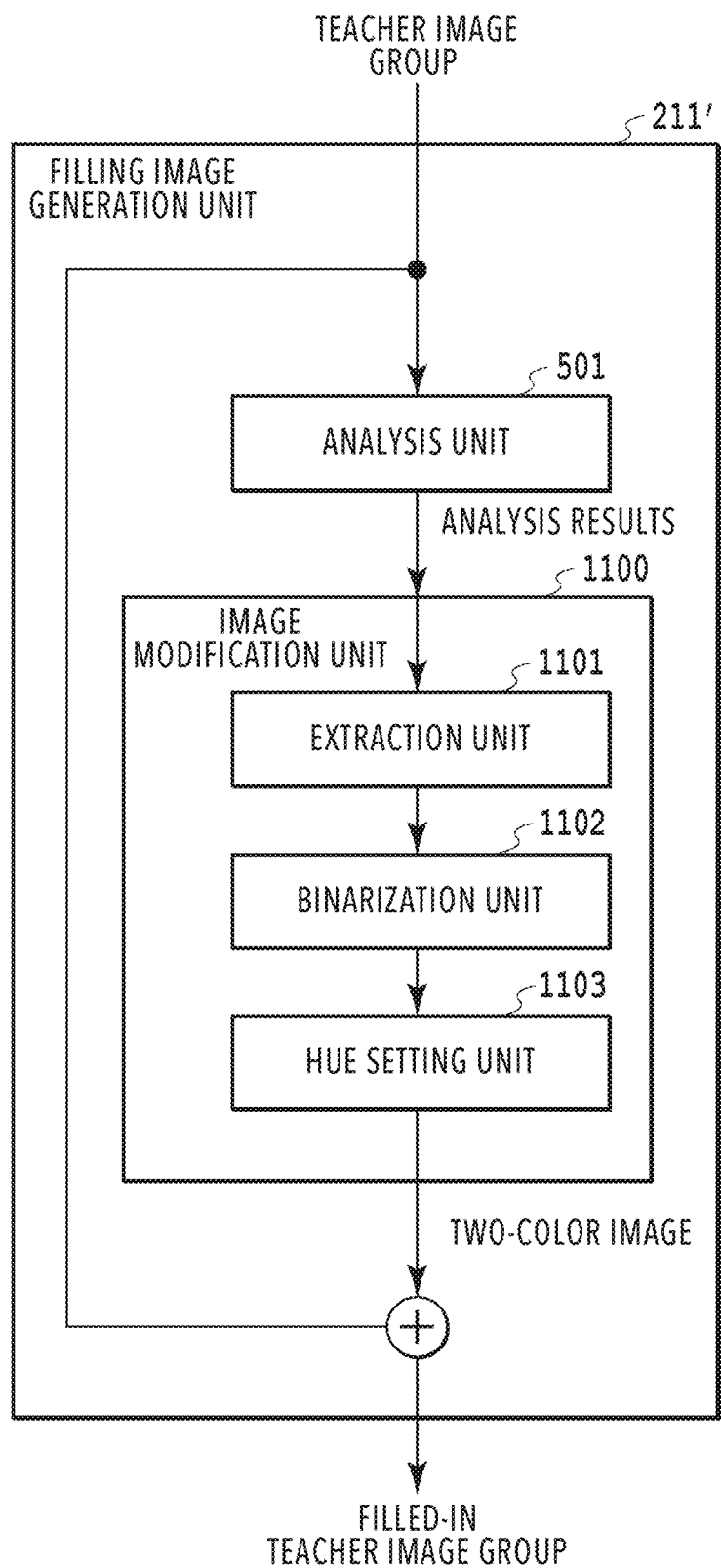
FIG. 11 is a block diagram showing an internal configuration of a filling image generation unit according to a second embodiment.
Figure 12:
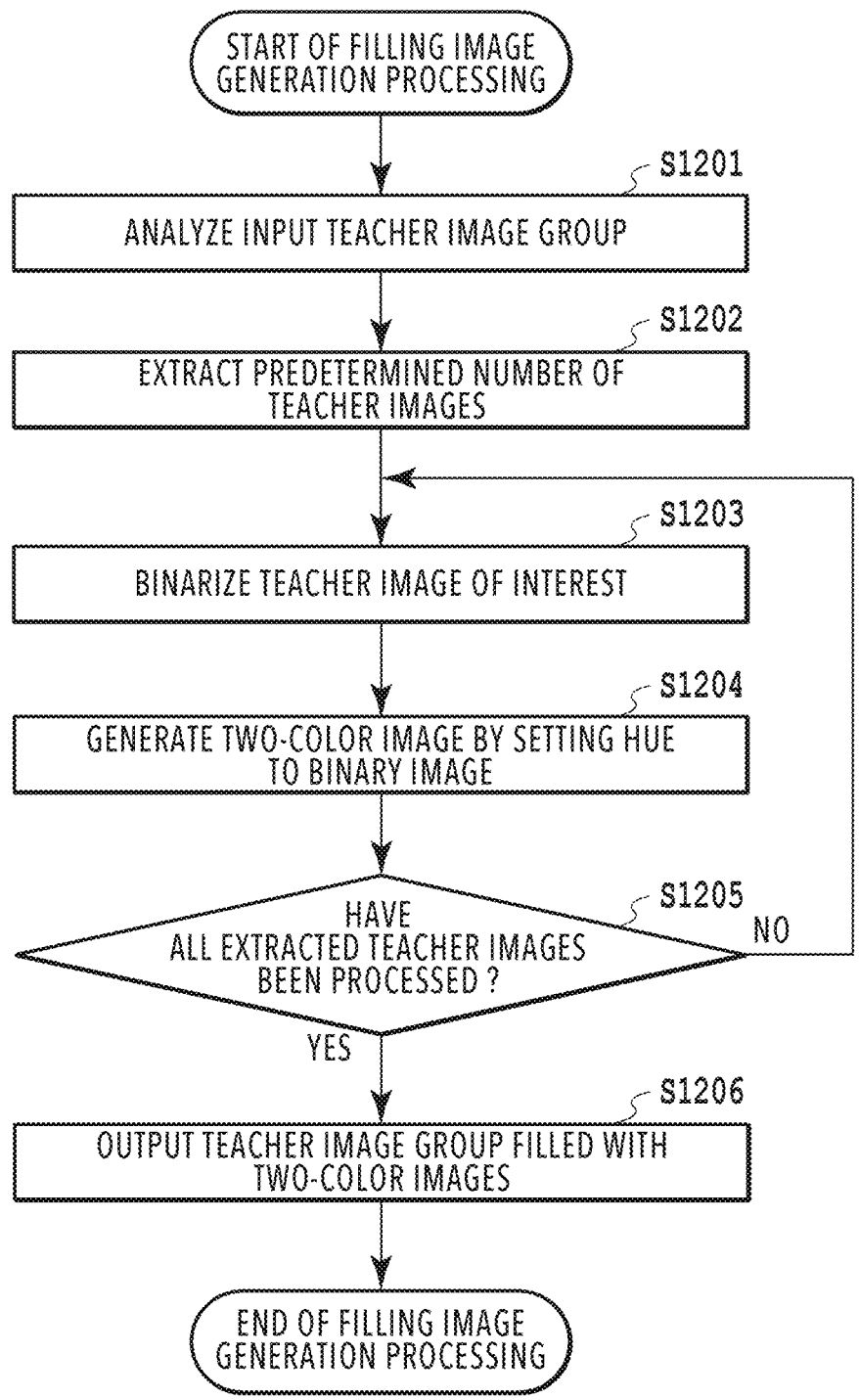
FIG. 12 is a flowchart showing details of filling image generation processing according to the second embodiment.

FIG. 11 is a block diagram showing the internal configuration of a filling image generation unit 211'. As shown in FIG. 11, the filling image generation unit 211' has the analysis unit 501 and an image modification unit 1100. Further, the image modification unit 1100 comprises an extraction unit 1101, a binarization unit 1102, and a hue setting unit 1103. FIG. 12 is a flowchart showing details of filling image generation processing according to the present embodiment. In the following, the operation of the filling image generation unit 211' is explained along the flow in FIG. 12.

At S1201, as at S601 in the flow in FIG. 6 described previously, the analysis unit 501 analyzes the hue distribution of an input teacher image group.

At S1202, the extraction unit 1101 extracts an arbitrary teacher image that is the target of modification processing from the input teacher image group. At the time of extraction, the number of teacher images corresponding to a predetermined ratio set in advance (for example, 20% of the teacher image group and the like) is extracted randomly.

At S1103, the binarization unit 1102 generates a binary image that represents each pixel by the white pixel or the black pixel by performing binarization for the teacher image of interest among all the teacher images extracted at S1202.

For the binarization processing, it may be possible to apply a publicly known method, such as the threshold value designation method and the P tile method.

Figure 13A:
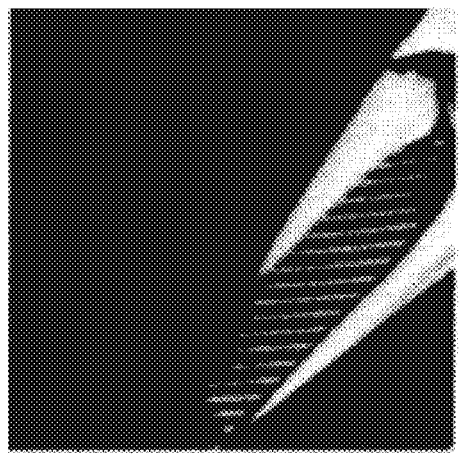
FIG. 13A to FIG. 13C are diagrams explaining a generation process of a CG image.
Figure 13B:
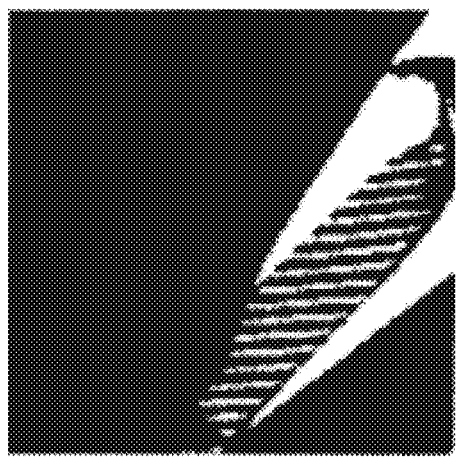
Figure 13C:
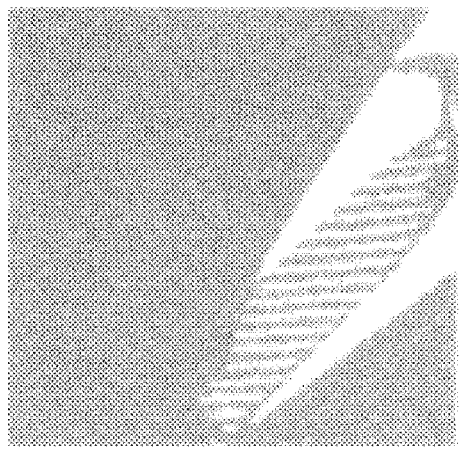

At S1204, the hue setting unit 1103 sets two kinds of hue based on the hue information file to the binary image generated at S1203 and generates CG images for filling in the sparse portion of the hue distribution. The image that is generated here is an image (in the following, called "two-color image") that represents a variety of colors included in the teacher image of interest by the colors of the set two kinds of hue. Here, with reference to FIG. 13, the process until a two-color image is completed is explained. FIG. 13A shows the teacher image extracted at S1201 and FIG. 13B shows the binary image obtained by the binarization processing at SI 102. The image obtained by allocating the color of hue_1 to the black pixel in this binary image and allocating the color of hue_2 to the white pixel is the two-color image shown in FIG. 13C. In the two-color image, it is only required that the variety of colors included in the teacher image of interest be represented by the colors of two kinds of hue, and therefore, it may also be possible to allocate the color of hue_1 to the white pixel and the color of hue 2 to the black pixel.

At S1205, whether or not the two-color image is generated based on all the teacher images extracted at S1202, that is, whether there is an unprocessed teacher image is determined. In a case where there is an unprocessed teacher image, the processing returns to S1103, and the next teacher image of interest is determined and the processing is continued. On the other hand, in a case where the two-color image is generated from all the extracted teacher images, the processing advances to S1206.

At S1206, the teacher image group that becomes the analysis target at S1201 is filled with a plurality of two-color images generated at S1204 and output to the data set generation unit 212 as the data of a new teacher image group with no deviation in the hue distribution.

The above is the contents of the filling image generation processing according to the present embodiment. As described above, by the method of modifying the teacher image included in the prepared teacher image group, it is also possible to fill in the sparse portion of the hue distribution.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to obtain a trained model whose robustness is high in learning of a CNN-based network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-091353, filed May 26, 2020 which is hereby incorporated by reference wherein in its entirety.

What is claimed is:

1. An information processing apparatus that generates learning data used for machine learning, the apparatus comprising:
a processor; and
a memory, including instructions thereon, which when executed by the processor cause the apparatus to:
acquire a teacher image group;
analyze a distribution characteristic of teacher images consisting of the teacher image group; and
generate a teacher image group uniform in the distribution characteristic based on results of the analysis, wherein the distribution characteristic represents a distribution in the teacher image group of at least one of three attributes of color,
wherein generating the teacher image group uniform in a distribution characteristic is performed by adding an image that fills in a sparse portion in the distribution characteristic to the analyzed teacher image group,
wherein the image that fills in the sparse portion is an image including pixels having a first color attribute value whose appearance frequency in the distribution characteristic obtained by the analysis is lower than a threshold and pixels having a second attribute value different from the first color attribute, and is an image generated in accordance with combinations of the first color attribute and the second color attribute.

2. The information processing apparatus according to claim 1, wherein the instructions, when executed by the processor, further cause the apparatus to:
analyze, as the distribution characteristic, a hue distribution of each teacher image included in the teacher image group and
generate, based on the analyzed teacher image group, a teacher image group uniform in a hue distribution.

3. The information processing apparatus according to claim 1, wherein the instructions, when executed by the processor, further cause the apparatus to:
analyze, as the distribution characteristic, a luminance distribution of each teacher image included in the teacher image group and
generate, based on the analyzed teacher image group, a teacher image group uniform in a luminance distribution.

4. The information processing apparatus according to claim 1, wherein the instructions, when executed by the processor, further cause the apparatus to:
analyze, as the distribution characteristic, a saturation distribution of each teacher image included in the teacher image group and
generate, based on the analyzed teacher image group, a teacher image group uniform in a saturation distribution.

5. The information processing apparatus according to claim 1, wherein the instructions, when executed by the processor, further cause the apparatus to:
generate a teacher image group uniform in a distribution characteristic by thinning teacher images corresponding to a dense portion in the distribution characteristic from the analyzed teacher image group.

6. The information processing apparatus according to claim 1, wherein
the image that fills in the sparse portion is a CG image obtained by drawing a predetermined object and
the instructions, when executed by the processor, further cause the apparatus to: generate the CG (Computer Graphics) image based on shape information corresponding to the predetermined object and performs the addition.

7. The information processing apparatus according to claim 6, wherein
the object specified by the shape information includes at least one connection area having a substantially equal pixel value and the size of each connection area is larger than a filter size of a CNN (Convolutional Neural Network) and a shape of a hue histogram of all the connection areas has bimodality.

8. The information processing apparatus according to claim 7, wherein
the predetermined object includes at least one or more of figure, symbol, character, and repetitive pattern.

9. The information processing apparatus according to claim 6, wherein the instructions, when executed by the processor, further cause the apparatus to:
generate a CG image so that a ratio of a number of CG images to a total number of teacher images consisting the teacher image group becomes constant.

10. The information processing apparatus according to claim 1, wherein the instructions, when executed by the processor, further cause the apparatus to:
generate, in a case where a generated CG image does not satisfy a predetermined condition, a CG image that satisfies the predetermined condition by integrating the generated CG image with another CG image.

11. The information processing apparatus according to claim 10, wherein
the predetermined condition is a case where a ratio between areas occupied respectively by two kinds of pixel having different attribute values in a generated CG image exceeds a predetermined ratio.

12. The information processing apparatus according to claim 1, wherein
the image that fills in the sparse portion is an image obtained by performing predetermined modification for a specific teacher image extracted from the teacher image group.

13. The information processing apparatus according to claim 12, wherein the instructions, when executed by the processor, further cause the apparatus to:
perform, as the predetermined modification, processing to generate a binary image by performing binarization processing for the specific teacher image and give different attribute values to a black pixel and a white pixel for each pixel configuring the binary image.

14. The information processing apparatus according to claim 1, wherein the instructions, when executed by the processor, further cause the apparatus to:
  generate a data set including a set of a teacher image and a pupil image based on the teacher image group uniform in the distribution characteristic generated by the generation unit; and
  perform machine learning by using the generated data set.

15. The information processing apparatus according to claim 14, wherein the instructions, when executed by the processor, further cause the apparatus to:
  acquire a development-target RAW image; and
  generate, for the RAW image, an RGB image including three channels of RGB by performing demosaic by inference using a trained demosaic network obtained by the machine learning.

16. An information processing method for generating learning data used for machine learning, the method comprising the steps of:
  acquiring a teacher image group;
  analyzing a distribution characteristic of teacher images consisting of the teacher image group; and
  generating a teacher image group uniform in the distribution characteristic based on results of the analysis, wherein the distribution characteristic represents a distribution in the teacher image group of at least one of three attributes of color,
  wherein generating a teacher image group uniform in a distribution characteristic is performed by adding an image that fills in a sparse portion in the distribution characteristic to the analyzed teacher image group,
  wherein the image that fills in the sparse portion is an image including pixels having a first color attribute value whose appearance frequency in the distribution characteristic obtained by the analysis is lower than a threshold and pixels having a second attribute value different from the first color attribute, and is an image generated in accordance with combinations of the first color attribute and the second color attribute.

17. A non-transitory computer readable storage medium storing a program for causing a computer to perform an information processing method for generating learning data used for machine learning, the method comprising the steps of:
  acquiring a teacher image group;
  analyzing a distribution characteristic of teacher images consisting of the teacher image group; and
  generating a teacher image group uniform in the distribution characteristic based on results of the analysis, wherein the distribution characteristic represents a distribution in the teacher image group of at least one of three attributes of color,
  wherein generating a teacher image group uniform in a distribution characteristic is performed by adding an image that fills in a sparse portion in the distribution characteristic to the analyzed teacher image group,
  wherein the image that fills in the sparse portion is an image including pixels having a first color attribute value whose appearance frequency in the distribution characteristic obtained by the analysis is lower than a threshold and pixels having a second attribute value different from the first color attribute, and is an image generated in accordance with combinations of the first color attribute and the second color attribute.

* * * * *